(12) United States Patent
Yang et al.

(10) Patent No.: US 12,142,007 B2
(45) Date of Patent: Nov. 12, 2024

(54) OPTICAL INFORMATION DETECTION METHOD, DEVICE AND EQUIPMENT

(71) Applicant: ORBBEC INC., Guangdong (CN)

(72) Inventors: Peng Yang, Shenzhen (CN); Wenjian Li, Shenzhen (CN); Zhao Min Wang, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 279 days.

(21) Appl. No.: 17/732,773

(22) Filed: Apr. 29, 2022

(65) Prior Publication Data

US 2022/0254067 A1 Aug. 11, 2022

Related U.S. Application Data

(63) Continuation of application No. PCT/CN2020/138123, filed on Dec. 21, 2020.

(30) Foreign Application Priority Data

Jul. 20, 2020 (CN) .......................... 202010697772.0

(51) Int. Cl.
*G06T 7/80* (2017.01)
*G06T 7/13* (2017.01)
*G06V 10/40* (2022.01)

(52) U.S. Cl.
CPC ................. *G06T 7/80* (2017.01); *G06T 7/13* (2017.01); *G06V 10/40* (2022.01)

(58) Field of Classification Search
CPC .. G06T 7/80; G06T 7/13; G06T 7/593; G06T 7/85; G06T 7/521; G06T 7/0008;
(Continued)

(56) References Cited

U.S. PATENT DOCUMENTS 10,706,528 B2 * 7/2020 Marrion ................. G06T 7/85
10,740,917 B2 8/2020 Ge et al.
(Continued)

FOREIGN PATENT DOCUMENTS

CN 108230399 A 6/2018
CN 109342028 A 2/2019
(Continued)

OTHER PUBLICATIONS

PCT International Search Report and the Written Opinion mailed Apr. 2, 2021, issued in related International Application No. PCT/CN2020/138123, with partial English translation (12 pages).

*Primary Examiner* — Huy C Ho
(74) *Attorney, Agent, or Firm* — Sheppard Mullin Richter & Hampton LLP

(57) ABSTRACT

An optical information detection method includes: acquiring a first image captured by a first imaging device, wherein the first image comprises a target full-field projection pattern; extracting features from the first image to obtain first feature information; acquiring second feature information and first graphic information of a reference full-field projection pattern, wherein the first graphic information comprises zero-order information and/or secondary information; calculating a first mapping relationship between the first feature information and the second feature information; mapping the first graphic information to the target full-field projection pattern according to the first mapping relationship, to obtain second graphic information corresponding to the target full-field projection pattern; and calculating target optical information according to the second graphic information. The above-mentioned method is compatible with cases in which, regardless of whether a zero-order speckle pattern is globally unique or not, optical information can be accurately detected.

20 Claims, 6 Drawing Sheets

(58) Field of Classification Search
CPC .......... G06T 7/60; G06V 10/40; G06V 10/44;
G06V 10/761; G06F 18/22
USPC ........................................................ 382/195
See application file for complete search history.

(56) References Cited

U.S. PATENT DOCUMENTS

2007/0206204 A1\* 9/2007 Jia ...................... G01B 11/2527
356/604
2009/0185274 A1\* 7/2009 Shpunt ............... G02B 27/4233
359/558

FOREIGN PATENT DOCUMENTS

| | | |
|---|---|---|
| CN | 110177266 A | 8/2019 |
| CN | 110189380 A | 8/2019 |
| CN | 110490938 A | 11/2019 |
| CN | 110657785 A | 1/2020 |
| CN | 110689581 A | 1/2020 |
| CN | 111354033 A | 6/2020 |
| CN | 111986154 A | 11/2020 |
| WO | 2018/229358 A1 | 12/2018 |

\* cited by examiner

OPTICAL INFORMATION DETECTION METHOD, DEVICE AND EQUIPMENT

CROSS-REFERENCE TO RELATED APPLICATIONS

This application is a continuation of International Patent Application No. PCT/CN2020/138123, filed with the China National Intellectual Property Administration (CNIPA) on Dec. 21, 2020, which is based on and claims priority to and benefits of Chinese Patent application CN202010697772.0, filed on Jul. 20, 2020. The entire content of all of the above-identified applications is incorporated herein by reference.

TECHNICAL FIELD

This application relates to the field of optical technologies, and in particular, to an optical information detection method, a device, and equipment.

BACKGROUND

Each depth measurement system based on a structured light or time of flight (TOF) technology includes a transmitting terminal and a receiving terminal. Optical information of the transmitting end and the receiving end, such as information about a relative rotation angle between an optical diffractive element and a light source in the transmitting end or information about an optical axis deflection angle between the transmitting end and the receiving end, needs to be detected before the system is used.

In the traditional optical information detection methods, a gray-scale similarity is used to perform image feature calculation, so as to calculate optical parameter information. When the gray-scale similarity is used to perform the image feature calculation, a zero-order projection pattern needs to be globally unique. However, when projection patterns are regularly arranged, the formed zero-order projection pattern is not unique, and optical information cannot be accurately calculated in this case.

SUMMARY

Embodiments of this application provide an optical information detection method, a device, and equipment, which can resolve a problem that optical information cannot be accurately calculated when projection patterns are regularly arranged.

According to a first aspect, an embodiment of this application provides an optical information detection method, including:
  acquiring a first image captured by a first camera, where the first image includes a target full-field projection pattern projected by a projection assembly;
  extracting features from the first image, to obtain first feature information;
  acquiring second feature information and first graphic information of a reference full-field projection pattern, where the first graphic information includes zero-order information and/or secondary information;
  calculating a first mapping relationship between the first feature information and the second feature information;
  mapping the first graphic information to the target full-field projection pattern according to the first mapping relationship, to obtain second graphic information corresponding to the target full-field projection pattern; and
  calculating target optical information according to the second graphic information.

Further, the first feature information comprises target full-field speckles in the target full-field projection pattern, and the second feature information comprises reference full-field speckles in the reference full-field projection pattern; and
  the calculating the first mapping relationship between the first feature information and the second feature information includes:
  calculating an initial mapping relationship between the target full-field speckles and the reference full-field speckles; and determining a mapping relationship between the target full-field speckles and the reference full-field speckles according to a local speckle correspondence and the initial mapping relationships.

Further, the target optical information includes brightness and darkness distribution information of the target full-field projection pattern and/or field of view information of the target full-field projection pattern.

Further, the projection assembly for projecting the target full-field projection pattern includes a light source and a diffractive optical element (DOE), and the light source comprises an array of vertical cavity surface emitting lasers (VCSELs); and
  the target optical information includes relative deflection information of the DOE and the light source, and/or information of one or more missing VCSELs of the array.

Further, the first feature information includes one or more of an internal feature of the target full-field speckles, a corner point feature of the target full-field speckles, and an edge curve feature of the target full-field speckles.

Further, the second feature information includes one or more of an internal feature of the reference full-field speckles, a corner point feature of the reference full-field speckles, and an edge curve feature of the reference full-field speckles.

Further, the calculating target optical information according to the second graphic information includes:
  acquiring a first calibrated pattern captured by the first camera and a second calibrated pattern captured by a second camera;
  calculating a second mapping relationship between the first calibrated pattern and the second calibrated pattern;
  mapping the second graphic information to the second calibrated pattern according to the second mapping relationship, to obtain third graphic information of the second calibrated pattern; and
  calculating an angle between an optical axis of the second camera and an optical axis of the projection assembly according to the third graphic information as the target optical information.

According to a second aspect, an embodiment of this application provides an optical information detection device, including:
  a first acquisition unit, configured to acquire a first image captured by a first camera, where the first image includes a target full-field projection pattern projected by a projection assembly;
  an extraction unit, configured to extract features from the first image to obtain first feature information;
  a second acquisition unit, configured to acquire second feature information and first graphic information of a reference full-field projection pattern, where the first graphic information includes zero-order information and/or secondary information;

a first calculation unit, configured to calculate a first mapping relationship between the first feature information and the second feature information;

a first processing unit, configured to map the first graphic information to the target full-field projection pattern according to the first mapping relationship, to obtain second graphic information corresponding to the target full-field projection pattern; and a second calculation unit, configured to calculate target optical information according to the second graphic information.

Further, the first feature information comprises target full-field speckles in the target full-field projection pattern, and the second feature information comprises reference full-field speckles in the reference full-field projection pattern;

the first calculation unit is specifically configured to:

calculate an initial mapping relationship between the target full-field speckles and the reference full-field speckles; and determine a mapping relationship between the target full-field speckles and the reference full-field speckles according to a local speckle correspondence and the initial mapping relationship.

Further, the target optical information includes brightness and darkness distribution information of the target full-field projection pattern and/or field of view information of the target full-field projection pattern.

Further, a projection assembly for projecting the target full-field projection pattern includes a light source and a DOE, and the light source comprises an array of VCSELs; and the target optical information includes relative deflection information of the DOE and the light source, and/or information of one or more missing VCSELs of the array.

Further, the first feature information includes one or more of an internal feature of the target full-field speckles, a corner point feature of the target full-field speckles, and an edge curve feature of the target full-field speckles.

Further, the second feature information includes one or more of an internal feature of the reference full-field speckles, a corner point feature of the reference full-field speckles, and an edge curve feature of the reference full-field speckles.

Further, the second calculation unit is specifically configured to:

acquire a first calibrated pattern captured by the first camera and a second calibrated pattern captured by a second camera;

calculate a second mapping relationship between the first calibrated pattern and the second calibrated pattern;

map the second graphic information to the second calibrated pattern according to the second mapping relationship, to obtain third graphic information of the second calibrated pattern; and calculate an angle between an optical axis of the second camera and an optical axis of the projection assembly according to the third graphic information as the target optical information.

According to a third aspect, an embodiment of this application provides an optical information detection equipment, including a memory, a processor, and a computer program stored in the memory, where the processor, when executing the computer program, implements the optical information detection method described in the first aspect.

According to a fourth aspect, an embodiment of this application provides a non-transitory computer-readable storage medium, storing a computer program, where the computer program, when executed by a processor, implements the optical information detection method described in the first aspect.

In the embodiments of this application, a first image captured by a first camera is acquired, where the first image includes a target full-field projection pattern; features are extracted from the first image to obtain first feature information; second feature information and first graphic information of a preset reference full-field projection pattern are acquired, where the first graphic information includes zero-order information and/or secondary information; a first mapping relationship between the first feature information and the second feature information is calculated; the first graphic information is mapped to the target full-field projection pattern according to the first mapping relationship to obtain second graphic information corresponding to the target full-field projection pattern; and target optical information is calculated according to the second graphic information. The above-mentioned method is compatible with cases in which a projection pattern projected by a projection assembly is regular or irregular. That is, in the speckle pattern projected by the projection assembly, regardless of whether a zero-order speckle pattern is globally unique or not, optical information can be accurately detected.

BRIEF DESCRIPTION OF THE DRAWINGS

To describe the technical solutions of the embodiments of this application more clearly, the following briefly introduces the accompanying drawings required for describing the embodiments or the existing technologies. Apparently, the accompanying drawings in the following description show only some embodiments of this application, and a person of ordinary skill in the art may derive other drawings according to the accompanying drawings without creative efforts.

DETAILED DESCRIPTION

The following description illustrates, but do not limit, specific details such as the specific system structure and technology to thoroughly understand the embodiments of this application. However, a person skilled in the art should know that this application may be implemented in other embodiments without these specific details. In other cases, detailed descriptions of well-known systems, devices, circuits, and methods are omitted to avoid unnecessary details hindering the description of this application.

It is to be understood that when used in the specification of this application and the appended claims, the term "include" indicates the presence of described features, wholes, steps, operations, elements and/or components, but does not exclude the presence or addition of one or more other features, wholes, steps, operations, elements, components and/or a set thereof.

It is to be further understood that a term "and/or" used in the specification of this application and the appended claims refers to one or more of any and all possible combinations of the associated items that are listed and includes the combinations.

As used in the specification of this application and the appended claims, the term "if" may be interpreted as "when" or "once" or "in response to determining" or "in response to detecting" according to the context. Similarly, the phrase "if determining" or "if detecting [described condition or event]" may be interpreted as "once determining" or "in response to determining" or "once detecting [described condition or event]" or "in response to detecting [described condition or event]" according to the context.

In addition, in the description of the specification of this application and the appended claims, terms "first," "second," and "third" are only used for distinguishing description and cannot be understood as indicating or implying relative importance.

The reference to "one embodiment" or "some embodiments" described in the specification of this application means that one or more embodiments of this application include a specific feature, structure, or feature described in combination with the embodiment. Therefore, the phrases "in an embodiment," "in some embodiments," "in other embodiments," "in some other embodiments," and the like. appearing in different places in this specification do not necessarily all refer to the same embodiment, but mean "one or more but not all embodiments," unless they are specifically emphasized in other ways. The terms "comprising," "including," "having," and their variations all mean "including but not limited to," unless otherwise specifically emphasized.

Figure 1:
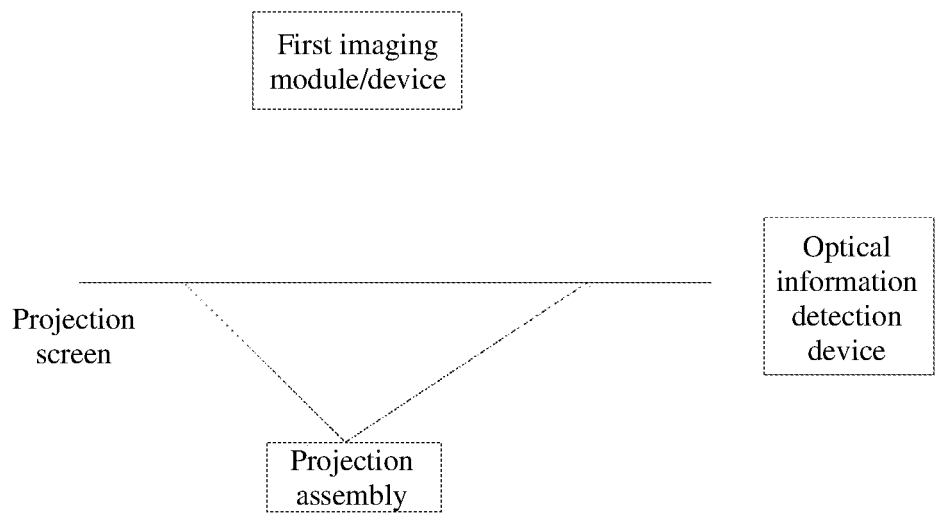
FIG. 1 is a schematic diagram of an optical information detection system, according to a first embodiment of this application.

FIG. 1 is a schematic diagram of an optical information detection system, according to a first embodiment of this application. The optical information detection system includes a projection assembly, a projection screen, a first imaging module/device, and a device having an optical information detection function and communicatively connected to the projection assembly and the first imaging module separately. The device having the optical information detection function may be a server, a processor, and the like. The projection assembly is configured to project a projection pattern onto the projection screen. The first imaging module is configured to capture a first image projected onto the projection screen, where the first image includes a target full-field projection pattern.

Figure 2:
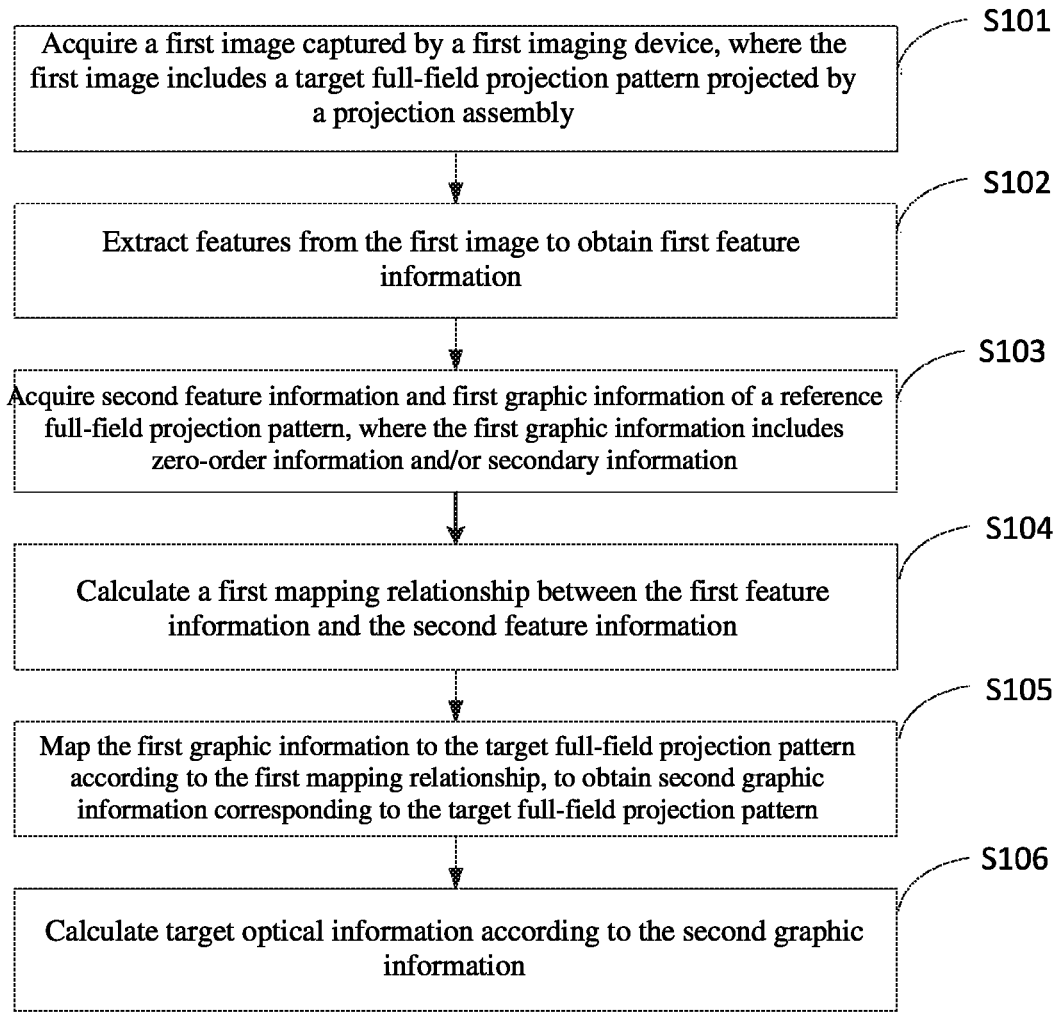
FIG. 2 is a schematic flowchart of an optical information detection method, according to a second embodiment of this application.

FIG. 2 is a schematic flowchart of an optical information detection method, according to a second embodiment of this application. An execution subject of the optical information detection method in this embodiment is a device having an optical information detection function, such as a server or a processor. The optical information detection method shown in FIG. 2 may include the following steps.

S101: Acquire a first image captured by a first imaging module, where the first image includes a target full-field projection pattern projected by a projection assembly/projector, and the target full-field projection pattern is the maximum projection pattern that can be provided by the projector.

The device acquires the first image captured by the first imaging module, where the first image includes the target full-field projection pattern. A projection assembly projects a projection pattern onto a projection screen, and the first imaging module captures the projection pattern on the projection screen. The image captured by the first imaging module is the first image, and the projection pattern included in the first image is the target full-field projection pattern.

In an embodiment, the projection assembly and the first imaging module may be respectively arranged on both sides of the projection screen, or may be arranged on the same side of the projection screen. The projection screen includes a glass plate, a piece of paper, and a PC pressing plate sequentially arranged along a direction of a light beam emitted by the projection assembly. In order to enable the first imaging module to capture a high-resolution projection pattern, transmittances of the glass plate, the piece of paper, and the PC pressing plate are guaranteed not less than 90%. It should be noted that in order to capture a full-field first image, a large wide-angle imaging module/device may be adopted as the first imaging module, or a distance between the first imaging module and the projection screen may be appropriately lengthened to prevent a field of view of the first imaging module from being excessively large to affect the quality of the captured first image.

The projection assembly includes a light source and a DOE, and the DOE is arranged on an optical path of emitting light emitted by the light source. The DOE is configured to project light generated by the light source onto the projection screen to form a projection pattern. It may be understood that a light beam emitted by the light source is diffused by the DOE and then projected onto the projection screen to form a structured light pattern. The light source may include an edge emitting laser, a VCSEL, a VCSEL array, or an LED. The VCSEL array may be regularly or irregularly arranged. The light generated by the light source may be visible light, infrared, ultraviolet, invisible light, and the like. The light source also supports encoded projection schemes including different images, such as a speckle pattern, a square pattern, a cross pattern, a stripe pattern, or a specific symbol pattern. It may be understood that a wavelength of light that can be captured by the first imaging module should be the same as a wavelength of the light projected by the projection assembly.

In an embodiment, when the projection pattern projected by the projection assembly is an infrared speckle pattern, the first imaging module is correspondingly an infrared camera.

S102: Extract features from the first image to obtain first feature information.

Figure 3:
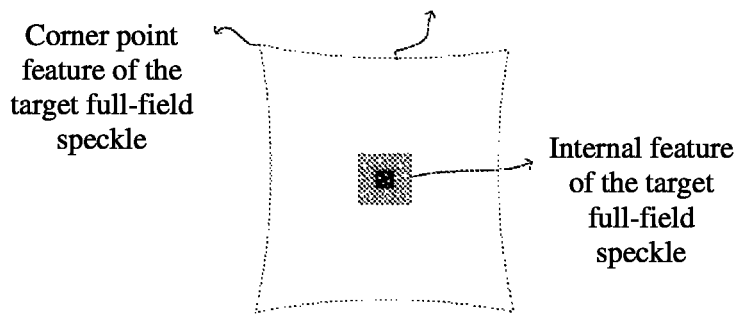
FIG. 3 is a schematic diagram of a target full-field projection pattern in the optical information detection method, according to the second embodiment of this application.
Figure 4:
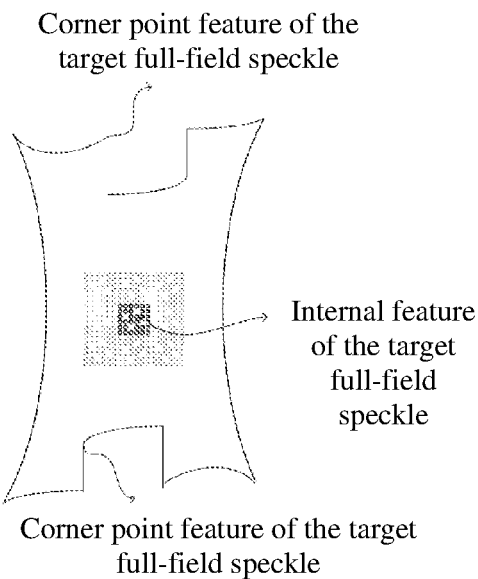
FIG. 4 is a schematic diagram of the target full-field projection pattern in the optical information detection method, according to the second embodiment of this application.

The device extracts features from the captured first image, and extracts feature information of the target full-field projection pattern in the first image to obtain first feature information. When the target full-field projection pattern is a speckle pattern, the first feature information may include one or more of an internal feature of the target full-field speckles, a corner point feature of the target full-field speckles, and an edge curve feature of the target full-field speckles. FIG. 3 and FIG. 4 are schematic diagrams of the target full-field projection pattern and schematic diagrams of the internal feature of the target full-field speckles, the corner point feature of the target full-field speckles, and the edge curve feature of the target full-field speckles. It may be understood that the schematic diagrams shown in FIG. 3 and FIG. 4 are only two forms of the target full-field projection pattern, but not a limitation on the target full-field projection pattern.

S103: Acquire second feature information and first graphic information of a preset reference full-field projection pattern, where the first graphic information includes zero-order information and/or secondary information.

The second feature information of the preset reference full-field projection pattern is stored in the device, where the preset reference full-field projection pattern is the pre-captured projection pattern projected onto the projection screen by the projection assembly. The second feature information may include one or more of an internal feature of reference full-field speckles, a corner point feature of the reference full-field speckles, and an edge curve feature of the reference full-field speckles. For the internal feature of the reference full-field speckles, the corner point feature of the reference full-field speckles, and the edge curve feature of the reference full-field speckles, reference may be made to the description in S102 relevant to the internal feature of the target full-field speckles, the corner point feature of the target full-field speckles, and the edge curve feature of the target full-field speckles, and details are not described herein again.

The device obtains the first graphic information, where the graphic information includes the zero-order information and/or the secondary information. The zero-order information may include a zero-order point, a zero-order speckle pattern, and the like; and the secondary information may include coordinates of a speckle, gray-scale information, and the like.

S104: Calculate a first mapping relationship between the first feature information and the second feature information. The device calculates the first mapping relationship between the first feature information and the second feature information according to the first feature information and the second feature information. The first mapping relationship essentially further represents a relationship between the preset reference full-field projection pattern and the target full-field projection pattern.

Figure 5:
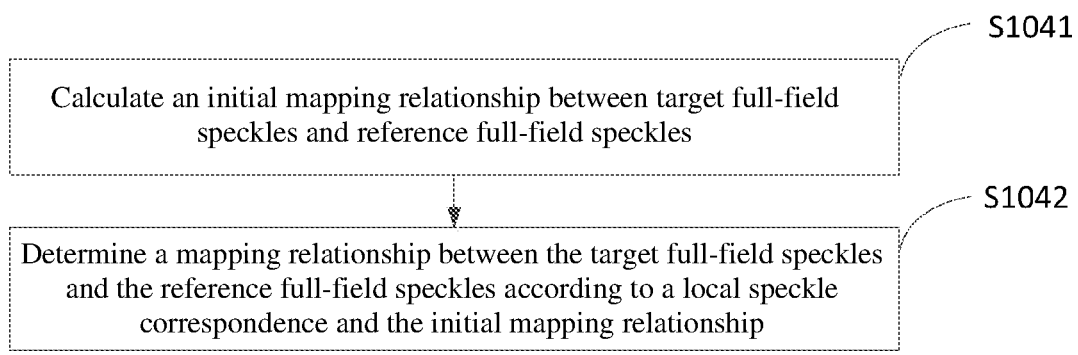
FIG. 5 is a schematic flowchart of details of S104 in the optical information detection method, according to the second embodiment of this application.

Further, the first feature information is the target full-field speckles in the target full-field projection pattern, and the second feature information is the reference full-field speckles in the reference full-field projection pattern. S104 may include S1041 to S1042. As shown in FIGS. 5, S1041 and S1042 are specifically as follows:

S1041: Calculate an initial mapping relationship between a target full-field speckle and a reference full-field speckle.

In this embodiment, the first feature information is the target full-field speckles in the target full-field projection pattern, and the second feature information is the reference full-field speckles in the reference full-field projection pattern. The device calculates the initial mapping relationship between the target full-field speckles and the reference full-field speckles according to the target full-field speckles and the reference full-field speckles. For example, the initial mapping relationship is calculated by using the homography of the reference full-field speckles and the target full-field speckles, and calculation on the initial mapping relationship according to edge curve features of full-field speckles may be performed by using the homography of an edge curve in the reference full-field projection pattern and an edge curve in the target full-field projection pattern.

S1042: Determine a mapping relationship between the target full-field speckles and the reference full-field speckles according to a preset local speckle correspondence and the initial mapping relationship.

The device stores the preset local speckle correspondence, and the preset local speckle correspondence may include speckle block similarity information, local nearest neighbor information of a speckle, and the like. The device determines the mapping relationship between the target full-field speckles and the reference full-field speckles according to the preset local speckle correspondence and the initial mapping relationship.

S105: Map the first graphic information to the target full-field projection pattern according to the first mapping relationship, to obtain second graphic information corresponding to the target full-field projection pattern.

The device maps the first graphic information to the target full-field projection pattern according to the first mapping relationship to obtain graphic information of the first graphic information in the target full-field projection pattern, that is, the second graphic information. For example, the device maps the zero-order information to the target full-field projection pattern according to the first mapping relationship to obtain zero-order information of the zero-order information in the target full-field projection pattern, as the second graphic information.

S106: Calculate the target optical information according to the second graphic information.

The device may calculate the target optical information according to the corresponding second graphic information in the target full-field projection pattern. A calculation rule may be preset in the device, and the calculation rule is determined according to the type of the target optical information. The target optical information is calculated according to the calculation rule.

The target optical information may include brightness and darkness distribution information of the target full-field projection pattern and/or field of view information of the target full-field projection pattern.

In an embodiment, the projection assembly for projecting the projection target full-field projection pattern includes a light source and a DOE, and the light source comprises an array including a plurality of VCSELs, and the target optical information may include relative deflection information of the DOE and the light source, and/or information of one or more missing VCSELs of the array. The VCSEL array can project different speckle matrix patterns of combined light spots via the DOE under the control of a processor, where the DOE can form a final speckle pattern on the projection screen by performing operations such as replication, overlaying and/or rotation on an original pattern formed by the VCSEL array. Therefore, the speckle pattern and a VCSEL light source of the VCSEL array have a one-to-one correspondence in a spatial position, and then the speckle pattern can be used to detect whether a single VCSEL light source in VCSEL array light sources is missing, to obtain the information of one or more missing VCSELs of the array.

Figure 6:
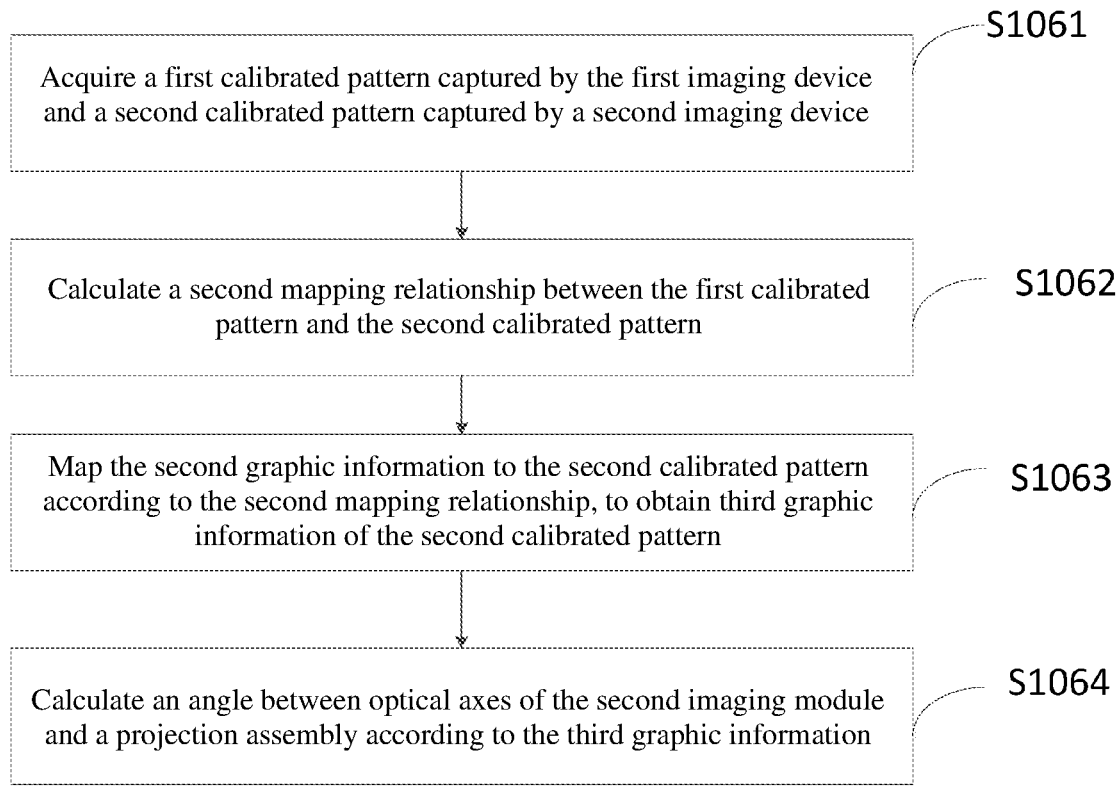
FIG. 6 is a schematic flowchart of details of S106 in the optical information detection method, according to the second embodiment of this application.

In an embodiment, the target optical information is an angle between optical axes of a second imaging module/device and the projection assembly. S106 may include S1061 to S1064. As shown in FIGS. 6, S1061 to S1064 are specifically as follows:

S1061: Acquire a first calibrated pattern captured by the first imaging module and a second calibrated pattern captured by the second imaging module.

In this embodiment, the optical information detection device includes the second imaging module, and the target optical information that needs to be finally calculated is the angle between the optical axes of the second imaging module and the projection assembly.

In this embodiment, the optical information detection device further includes the second imaging module and a calibrated pattern projector. The calibrated pattern projector is configured to project a calibrated pattern onto the projection screen. The calibrated pattern is not limited to a checkerboard, speckles, and the like, so as to provide enough features. An imaging module is configured to capture the above-mentioned calibrated pattern. It should be noted that when the above-mentioned calibrated pattern projector is turned on, the projection assembly needs to be turned off. For the convenience of the distinction, the calibrated pattern captured by the first imaging module is recorded as the first calibrated pattern, and the calibrated pattern captured by the second imaging module is recorded as the second calibrated pattern.

S1062: Calculate a second mapping relationship between the first calibrated pattern and the second calibrated pattern.

The device calculates the second mapping relationship between the first calibrated pattern and the second calibrated pattern. The second mapping relationship identifies a relationship between the first imaging module and the second imaging module.

S1063: Map the second graphic information to the second calibrated pattern according to the second mapping relationship, to obtain third graphic information of the second calibrated pattern.

The device maps the second graphic information to the second calibrated pattern according to the second mapping relationship, to obtain graphic information of the second graphic information in the second calibrated pattern, that is, the third graphic information. For example, the device maps the zero-order information to the second calibrated pattern according to the second mapping relationship, to obtain zero-order information of the zero-order information in the second calibrated pattern, that is, the third graphic information.

S1064: Calculate the angle between the optical axes of the second imaging module and the projection assembly according to the third graphic information.

The device determines coordinates of mapped points in the first calibrated pattern according to the third graphic information, and calculates the angle between the optical axes of the projection assembly and the second imaging module according to the coordinates of the mapped points in the first calibrated pattern. In this embodiment of this application, the first image captured by the first imaging module is acquired, where the first image includes the target full-field projection pattern; features are extracted from the first image to obtain the first feature information; the second feature information and the first graphic information of the preset reference full-field projection pattern are acquired, where the first graphic information includes the zero-order information and/or the secondary information; the first mapping relationship between the first feature information and the second feature information is calculated; the first graphic information is mapped to the target full-field projection pattern according to the first mapping relationship to obtain the second graphic information corresponding to the target full-field projection pattern; and the target optical information is calculated according to the second graphic information. The above-mentioned method is compatible with cases in which a projection pattern projected by a projection assembly is regular or irregular, that is, in the speckle pattern projected by the projection assembly, regardless of whether a zero-order speckle pattern is globally unique or not, optical information can be accurately detected.

It is to be understood that the order of the sequence numbers of the steps in the above-mentioned embodiments does not mean the order of execution, and the execution order of each process is determined by a function and inherent logic of the process, and does not constitute any limitation on the implementation process of this embodiment of this application.

Figure 7:
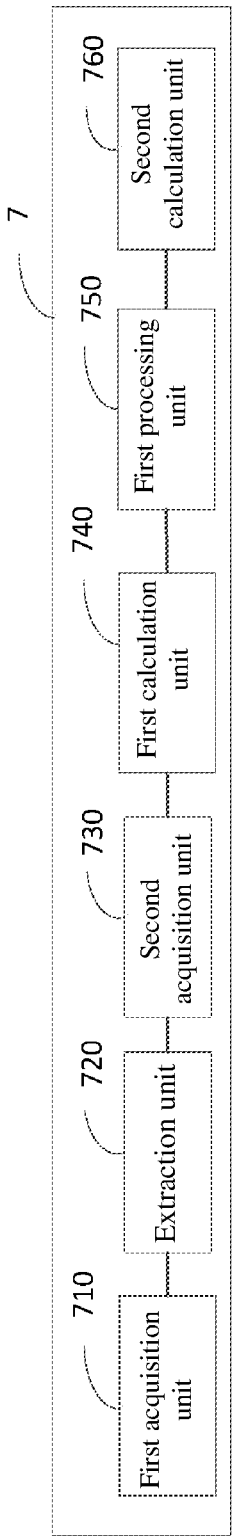
FIG. 7 is a schematic diagram of an optical information detection device, according to a third embodiment of this application.

FIG. 7 is a schematic diagram of an optical information detection device, according to a third embodiment of this application. The included units are configured to perform the steps in the embodiments corresponding to FIG. 2, FIG. 5, and FIG. 6. For details, refer to the relevant descriptions in the embodiments respectively corresponding to FIG. 2, FIG. 5, and FIG. 6. For ease of description, only parts related to this embodiment are shown. Referring to FIG. 7, the optical information detection device 7 includes: a first acquisition unit 710, configured to acquire a first image captured by a first imaging module, where the first image includes a target full-field projection pattern; an extraction unit 720, configured to extract features from the first image to obtain first feature information; a second acquisition unit 730, configured to acquire second feature information and first graphic information of a preset reference full-field projection pattern, where the first graphic information includes zero-order information and/or secondary information; a first calculation unit 740, configured to calculate a first mapping relationship between the first feature information and the second feature information; a first processing unit 750, configured to map the first graphic information to the target full-field projection pattern according to the first mapping relationship, to obtain second graphic information corresponding to the target full-field projection pattern; and a second calculation unit 760, configured to calculate target optical information according to the second graphic information.

Further, the first feature information comprises target full-field speckles in the target full-field projection pattern, and the second feature information comprises reference full-field speckles in the reference full-field projection pattern; and the first calculation unit 740 is specifically configured to: calculate an initial mapping relationship between a target full-field speckle and a reference full-field speckle; and determine a mapping relationship between the target full-field speckle and the reference full-field speckle according to a preset local speckle correspondence and the initial mapping relationship.

In an embodiment, the target optical information includes brightness and darkness distribution information of the target full-field projection pattern and/or field of view information of the target full-field projection pattern.

In an embodiment, a projection assembly for projecting the target full-field projection pattern includes a light source and a DOE, and the light source is an array including a plurality of VCSELs; and the target optical information includes relative deflection information of the DOE and the light source, and/or information of one or more missing VCSELs of the array.

In an embodiment, the first feature information includes one or more of an internal feature of the target full-field speckles, a corner point feature of the target full-field speckles, and an edge curve feature of the target full-field speckles. The second feature information includes one or more of an internal feature of the reference full-field speckles, a corner point feature of the reference full-field speckles, and an edge curve feature of the reference full-field speckles.

The target optical information is an angle between optical axes of a second imaging module and the projection assembly; and the second calculation unit 760 is specifically configured to: acquire a first calibrated pattern captured by the first imaging module and a second calibrated pattern captured by the second imaging module; calculate a second mapping relationship between the first calibrated pattern and the second calibrated pattern; map the second graphic information to the second calibrated pattern according to the second mapping relationship, to obtain third graphic information of the second calibrated pattern; and calculate the angle between the optical axes of the second imaging module and the projection assembly according to the third graphic information.

Figure 8:
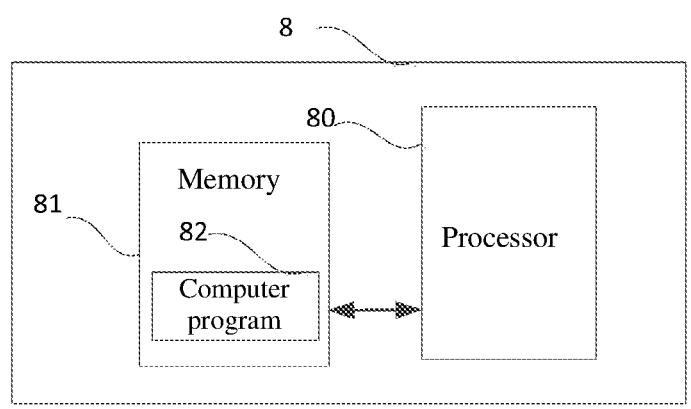
FIG. 8 is a schematic diagram of an optical information detection equipment, according to a fourth embodiment of this application.

FIG. 8 is a schematic diagram of an optical information detection equipment, according to a fourth embodiment of this application. As shown in FIG. 8, the optical information detection equipment 8 of this embodiment includes: a processor 80, a memory 81, and a computer program 82 stored in the memory 81 and executable on the processor 80, for example, an optical information detection program. The processor 80, when executing the computer program 82, implements the steps in the above-mentioned embodiments of the optical information detection method, for example, step 101 to step 106 shown in FIG. 2. In an embodiment, the processor 80, when executing the computer program 82, implements the functions of the modules/units in the above-mentioned device embodiments, such as the functions of the module 710 to the module 760 shown in FIG. 5.

In an embodiment, the computer program 82 may be divided into one or more modules/units, and the one or more modules/units are stored in the memory 81 and executed by the processor 80 to complete this application. The one or more modules/units may be a series of computer program instruction segments capable of completing specific functions, and the instruction segments are configured to describe the execution process of the computer program 82 in the optical information detection equipment 8. For example, the computer program 82 may be divided into a first acquisition unit, an extraction unit, a second acquisition unit, a first calculation unit, a first processing unit, and a second calculation unit, and the specific functions of each unit are as follows:

The first acquisition unit is configured to acquire a first image captured by a first imaging module, where the first image includes a target full-field projection pattern; the extraction unit is configured to extract features from the first image to obtain first feature information; the second acquisition unit is configured to acquire second feature information and first graphic information of a preset reference full-field projection pattern, where the first graphic information includes zero-order information and/or secondary information; the first calculation unit is configured to calculate a first mapping relationship between the first feature information and the second feature information; the first processing unit is configured to map the first graphic information to the target full-field projection pattern according to the first mapping relationship, to obtain second graphic information corresponding to the target full-field projection pattern; and the second calculation optical information according to the second graphic information.

The optical information detection equipment may include, but is not limited to, the processor 80 and the memory 81. A person skilled in the art may understand that FIG. 8 is merely an example of the optical information detection equipment 8, and does not constitute a limitation to the optical information detection equipment 8, and the optical information detection equipment 8 may include more or fewer components than those shown in the figure, or some components may be combined, or different components may be used. For example, the optical information detection equipment may further include an input and output device, a network access device, a bus, and the like.

The processor 80 may be a central processing unit (CPU), and may alternatively be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor and the like.

The memory 81 may be an internal storage unit of the optical information detection equipment 8, for example, a hard disk or a memory of the optical information detection equipment 8. The memory 81 may alternatively be an external storage device of the optical information detection equipment 8, such as a plug-in hard disk, a smart media card (SMC), a secure digital (SD) card, or a flash card equipped on the optical information detection equipment 8. Further, the optical information detection equipment 8 may alternatively include both the internal storage unit of the optical information detection equipment 8 and the external storage device. The memory 81 is configured to store the computer program and other programs and data required by the optical information detection equipment. The memory 81 may further be configured to temporarily store data that has been output or will be output.

It should be noted that content such as information exchange and an execution process between the above-mentioned apparatuses/units is based on the same idea as the method embodiments of this application. Therefore, for the specific functions and technical effects, refer to descriptions in the method embodiment section and details are not described herein again.

A person skilled in the art can clearly understand that, for the purpose of convenient and brief description, only division of the foregoing functional units and modules is used as an example for description. In the practical application, the functions may be allocated to and completed by different functional units and modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software functional unit. In addition, the specific names of each functional unit and module are only for the purpose of distinguishing each other, and are not used to limit the protection scope of this application. For specific work processes of the units and modules in the system, reference may be made to corresponding processes in the above-mentioned method embodiments, and details are not described herein again.

An embodiment of this application further provides a network device, including at least one processor, a memory, and a computer program stored in the memory and executable on at least one processor, where the processor, when executing the computer program, implements the steps in any one of the above-mentioned method embodiments.

An embodiment of this application further provides a computer-readable storage medium, storing a computer program, where the computer program, when executed by a processor, implements the steps in the above-mentioned method embodiments.

An embodiment of this application provides a computer program product, where the computer program product, when run on and executed by a mobile terminal, causes the mobile terminal to implement the steps in the above-mentioned method embodiments. When an integrated unit is implemented in the form of a software functional unit and sold or used as an independent product, the integrated unit may be stored in a computer-readable storage medium. Based on such understanding, all or some of the processes of the methods in the embodiments of this application may be implemented by a computer program instructing relevant hardware. The computer program may be stored in a computer-readable storage medium. During execution of the computer program by a processor, steps of the above-mentioned method embodiments may be implemented. The computer program includes computer program code. The computer program code may be in source code form, object code form, executable file or some intermediate forms, or the like. The computer-readable medium may at least include: any entity or apparatus that is capable of carrying the computer program code to the photographing apparatus/terminal device, a recording medium, a computer memory, a read-only memory (ROM), a random-access memory (RAM), an electric carrier signal, a telecommunication signal, and a software distribution medium. For example, a USB flash drive, a removable hard disk, a magnetic disk, or an optical disc. In some jurisdictions, according to legislation and patent practice, the computer-readable medium cannot be an electric carrier signal and a telecommunication signal.

In the embodiments, descriptions of the embodiments have different emphases. As for parts that are not described in detail in an embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the embodiment goes beyond the scope of this application.

In the embodiments provided in this application, it is to be understood that the disclosed apparatus/network device and method may be implemented in other manners. For example, the described apparatus/network device embodiment is merely schematic. For example, the module or unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and the components displayed as units may or may not be physical units, that is, may be located in one place or may be distributed over a plurality of network units. Some or all of the units may be selected according to actual requirements to achieve the objectives of the solutions of the embodiments.

The above-mentioned embodiments are merely intended for describing the technical solutions of this application, but not for limiting this application. Although this application is described in detail with reference to the foregoing embodiments, a person of ordinary skill in the art is to understand that they may still make modifications to the technical solutions described in the above-mentioned embodiments or make equivalent replacements to some technical features thereof, without departing from the spirit and scope of the technical solutions of the embodiments of this application, and the modifications or equivalent replacements should all fall within the protection scope of this application.

What is claimed is:

1. A method, comprising:
  acquiring a first image captured by a first camera, wherein the first image comprises a target full-field projection pattern projected by a projection assembly;
  extracting features from the first image to obtain first feature information;
  acquiring second feature information and first graphic information of a reference full-field projection pattern, wherein the first graphic information comprises zero-order information and/or secondary information;
  calculating a first mapping relationship between the first feature information and the second feature information;
  mapping the first graphic information to the target full-field projection pattern according to the first mapping relationship, to obtain second graphic information corresponding to the target full-field projection pattern; and
  calculating target optical information according to the second graphic information.

2. The method according to claim 1, wherein:
  the first feature information comprises target full-field speckles in the target full-field projection pattern, and the second feature information comprises reference full-field speckles in the reference full-field projection pattern; and
  the calculating the first mapping relationship between the first feature information and the second feature information comprises:
    calculating an initial mapping relationship between the target full-field speckles and the reference full-field speckles; and determining a mapping relationship between the target full-field speckles and the reference full-field speckles according to a local speckle correspondence and the initial mapping relationship.

3. The method according to claim 2, wherein the first feature information comprises one or more of an internal feature of the target full-field speckles, a corner point feature of the target full-field speckles, and an edge curve feature of the target full-field speckles.

4. The method according to claim 1, wherein the target optical information comprises brightness and darkness distribution information of the target full-field projection pattern and/or field of view information of the target full-field projection pattern.

5. The method according to claim 1, wherein the projection assembly for projecting the target full-field projection pattern comprises a light source and a diffractive optical element (DOE), and the light source comprises an array of vertical cavity surface emitting lasers (VCSELs); and the target optical information comprises relative deflection information of the DOE and the light source, and/or information of one or more missing VCSELs of the array.

6. The method according to claim 1, wherein the second feature information comprises one or more of an internal feature of reference full-field speckles, a corner point feature of the reference full-field speckles, and an edge curve feature of the reference full-field speckles.

7. The method according to claim 1, wherein:
the calculating target optical information according to the second graphic information comprises:
acquiring a first calibrated pattern captured by the first camera and a second calibrated pattern captured by a second camera;
calculating a second mapping relationship between the first calibrated pattern and the second calibrated pattern;
mapping the second graphic information to the second calibrated pattern according to the second mapping relationship, to obtain third graphic information of the second calibrated pattern; and
calculating an angle between an optical axis of the second camera and an optical axis of the projection assembly according to the third graphic information as the target optical information.

8. Optical information detection equipment, comprising a memory, a processor, and a computer program stored in the memory, wherein the processor executes the computer program to perform operations comprising:
acquiring a first image captured by a first camera, wherein the first image comprises a target full-field projection pattern projected by a projection assembly;
extracting features from the first image to obtain first feature information;
acquiring second feature information and first graphic information of a reference full-field projection pattern, wherein the first graphic information comprises zero-order information and/or secondary information;
calculating a first mapping relationship between the first feature information and the second feature information;
mapping the first graphic information to the target full-field projection pattern according to the first mapping relationship, to obtain second graphic information corresponding to the target full-field projection pattern; and
calculating target optical information according to the second graphic information.

9. The equipment according to claim 8, wherein:
the first feature information comprises target full-field speckles in the target full-field projection pattern, and the second feature information comprises reference full-field speckles in the reference full-field projection pattern; and
the calculating the first mapping relationship between the first feature information and the second feature information comprises:
calculating an initial mapping relationship between the target full-field speckles and the reference full-field speckles; and determining a mapping relationship between the target full-field speckles and the reference full-field speckles according to a local speckle correspondence and the initial mapping relationship.

10. The equipment according to claim 9, wherein the first feature information comprises one or more of an internal feature of the target full-field speckles, a corner point feature of the target full-field speckles, and an edge curve feature of the target full-field speckles.

11. The equipment according to claim 8, wherein the target optical information comprises brightness and darkness distribution information of the target full-field projection pattern and/or field of view information of the target full-field projection pattern.

12. The equipment according to claim 8, wherein the projection assembly for projecting the target full-field projection pattern comprises a light source and a diffractive optical element (DOE), and the light source comprises an array of vertical cavity surface emitting lasers (VCSELs); and
the target optical information comprises relative deflection information of the DOE and the light source, and/or information of one or more missing VCSELs of the array.

13. The equipment according to claim 8, wherein the second feature information comprises one or more of an internal feature of reference full-field speckles, a corner point feature of the reference full-field speckles, and an edge curve feature of the reference full-field speckles.

14. The equipment according to claim 8, wherein:
the calculating target optical information according to the second graphic information comprises:
acquiring a first calibrated pattern captured by the first camera and a second calibrated pattern captured by a second camera;
calculating a second mapping relationship between the first calibrated pattern and the second calibrated pattern;
mapping the second graphic information to the second calibrated pattern according to the second mapping relationship, to obtain third graphic information of the second calibrated pattern; and
calculating an angle between an optical axis of the second camera and an optical axis of the projection assembly according to the third graphic information as the target optical information.

15. A non-transitory computer-readable storage medium, storing a computer program, wherein the computer program, when executed by a processor, causes the processor to perform operations comprising:
acquiring a first image captured by a first camera, wherein the first image comprises a target full-field projection pattern projected by a projection assembly;
extracting features from the first image to obtain first feature information;
acquiring second feature information and first graphic information of a reference full-field projection pattern, wherein the first graphic information comprises zero-order information and/or secondary information;
calculating a first mapping relationship between the first feature information and the second feature information;
mapping the first graphic information to the target full-field projection pattern according to the first mapping relationship, to obtain second graphic information corresponding to the target full-field projection pattern; and
calculating target optical information according to the second graphic information.

16. The medium according to claim 15, wherein:
the first feature information comprises target full-field speckles in the target full-field projection pattern, and the second feature information comprises reference full-field speckles in the reference full-field projection pattern; and the calculating the first mapping relationship between the first feature information and the second feature information comprises:

calculating an initial mapping relationship between the target full-field speckles and the reference full-field speckles; and determining a mapping relationship between the target full-field speckles and the reference full-field speckles according to a local speckle correspondence and the initial mapping relationship.

17. The medium according to claim 16, wherein the first feature information comprises one or more of an internal feature of the target full-field speckles, a corner point feature of the target full-field speckles, and an edge curve feature of the target full-field speckles.

18. The medium according to claim 15, wherein the target optical information comprises brightness and darkness distribution information of the target full-field projection pattern and/or field of view information of the target full-field projection pattern.

19. The medium according to claim 15, wherein the second feature information comprises one or more of an internal feature of reference full-field speckles, a corner point feature of the reference full-field speckles, and an edge curve feature of the reference full-field speckles.

20. The medium according to claim 15, wherein:

the calculating target optical information according to the second graphic information comprises:

acquiring a first calibrated pattern captured by the first camera and a second calibrated pattern captured by a second camera;

calculating a second mapping relationship between the first calibrated pattern and the second calibrated pattern;

mapping the second graphic information to the second calibrated pattern according to the second mapping relationship, to obtain third graphic information of the second calibrated pattern; and calculating an angle between an optical axis of the second camera and an optical axis of the projection assembly according to the third graphic information as the target optical information.

* * * * *